Mar. 6, 1923.
T. I. TINGLEY.
RESILIENT WHEEL.
FILED JAN. 3, 1922.
1,447,362.
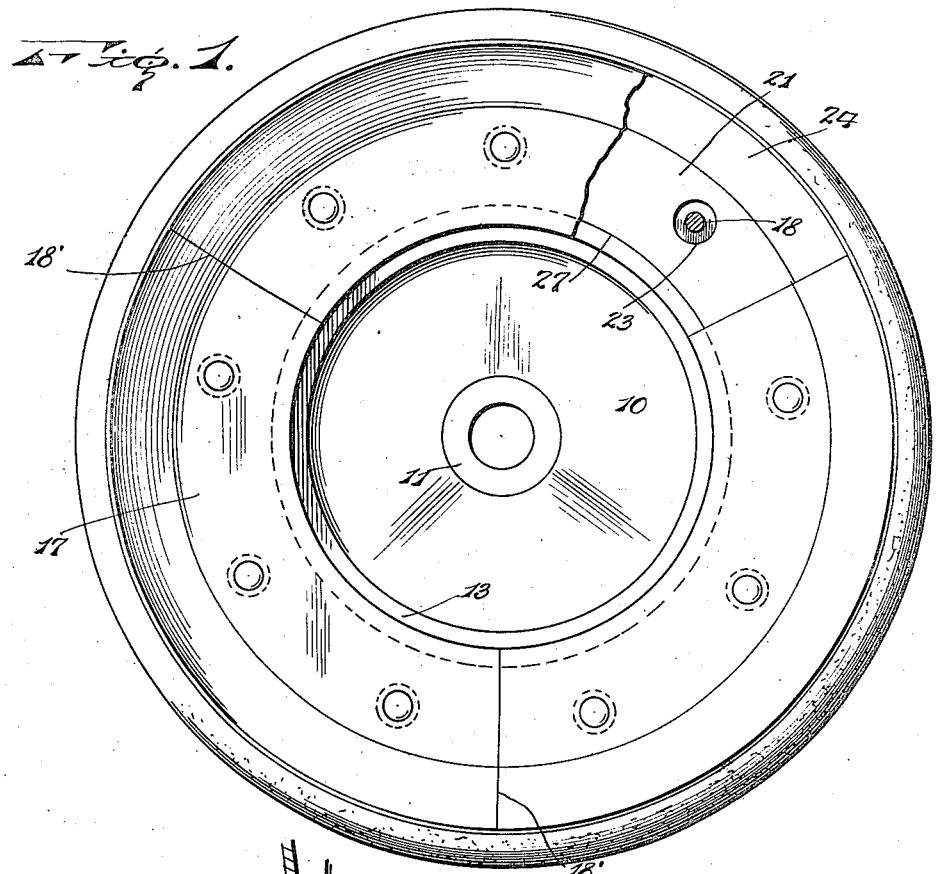
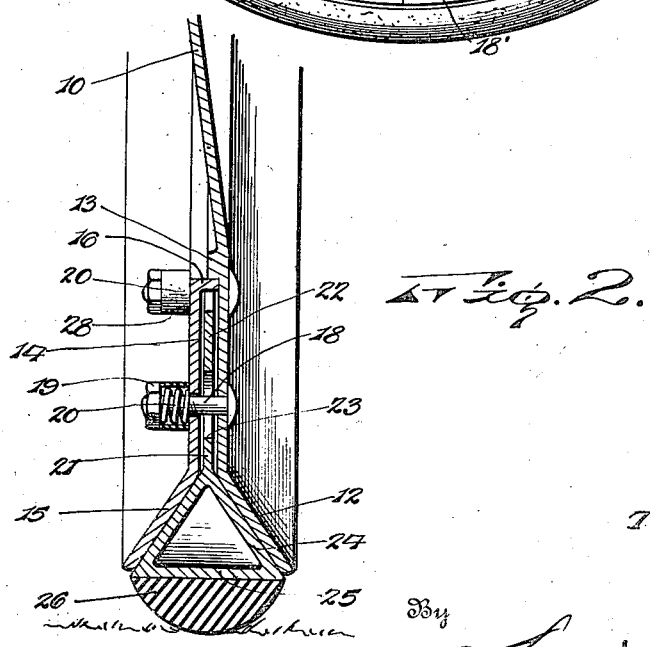
Inventor
T. I. Tingley.

Patented Mar. 6, 1923.

1,447,362

UNITED STATES PATENT OFFICE.

THOMAS I. TINGLEY, OF JERSEY CITY, NEW JERSEY.

RESILIENT WHEEL.

Application filed January 3, 1922. Serial No. 526,607.

*To all whom it may concern:*

Be it known that I, THOMAS I. TINGLEY, a citizen of the United States, residing at Jersey City, in the county of Hudson and State of New Jersey, have invented certain new and useful Improvements in Resilient Wheels, of which the following is a specification.

My invention consists of a resilient wheel for vehicles having the advantage that it is puncture-proof and may be used either with or without a solid rubber tire.

One object of the invention is to provide a wheel, that has a tread of sufficient firmness to run smoothly over an even roadway, but which at the same time possesses enough resiliency to lessen shocks on the vehicle, when passing over rough and uneven ground.

Another advantage of my wheel resides in the fact that a vehicle, equipped with my wheels, would be less apt to skid on slippery ground than a vehicle with ordinary wheels, as their flexibility in axial direction, would permit of a certain lateral displacement of the tire with regard to the wheel body and the vehicle. In the accompanying drawing one embodiment of the invention is illustrated, and Figure 1 shows a front elevation of the wheel; and Figure 2 a fragmentary cross section thereof.

My invention is illustrated as applied to a disk wheel, but it may equally well be applied to ordinary wooden wheels in which case the rim portion would have to be slightly modified. In the drawing, reference numeral 10 represents the body of a disk or plate wheel with the usual hub 11. This wheel body is dished and terminates with a flared-out rim portion 12 and is provided with an annular ledge 13.

A retaining member 14 is also provided with a similar rim portion 15, which however is flared in the opposite direction to the rim portion 12 of the wheel body, so as to form a wedge-shaped annular recess or channel between them. At its inner periphery the retaining member 14 has an abutment face 16 adapted to engage on the outer side of the ledge 13 of the wheel body 10. As seen in Figure 1 the retaining member 14 is divided into a number of arcuate sectitons 17 which contact along the radial dividing lines 18, so as to form a complete ring when put together. The sections constituting the retaining member 14 are held in place by means of bolts 18 engaging in corresponding holes in the wheel body 10 and the retaining member 14. These bolts carry nuts 19 and compression springs 20 between the nuts and the retaining member for the purpose of holding the retaining member pressed yieldably in inward direction. Dust caps 30 of rubber are provided around springs 20.

Numeral 21 represents the felloe for the wheel which is composed of a thin inner flange portion 22 fitting loosely between the wheel body 10 and the retaining member 14 and is provided with apertures 23 corresponding to the holes in the wheel body 10 but of larger size so as to fit with considerable play around the bolts 18, whereby permitting displacement of the felloe 21 in a plane perpendicular to the axis of the wheel. The outer or rim portion 24 of the felloe 21 is hollow and has the cross section of an equilateral triangle. The outer periphery 25 of this rim portion 24 forms the seat for the solid rubber tire 26 which is held tightly thereon. The other two sides of the rim portions 24 contact with the flared rim portions 12 and 15 of a wheel body and the retaining rim respectively. The strength of the coil springs 20 has been so selected that their pressures exerted against the retaining members 14 in transverse direction is sufficient to hold the felloe 21 concentric with the wheel body under an ordinary load on the vehicle. If, however, a blow is delivered against the tire 26, the felloe will be displaced at this point in radial direction of the wheel thereby compelling the section 17 of the retaining member 14, while the blow is delivered, to yield and open the channel formed between it and the wheel body 10. In order to permit sufficient displacement of the felloe 21 as regards the wheel body 10, the inner periphery 27 of the felloe is considerably larger than the periphery of the abutment portion 16 on the retaining member. As soon as the pressure at a certain point of the tire ceases, the felloe 21 will regain its coaxial position with regard to the rest of the wheel actuated by the springs 20.

It should here be noted that on other wheels of this character a yielding action is always transferred radially to the hub of the wheel whereas in this case it will be transmitted in the lateral direction thereof to the springs 20 and the bolts 18. It should also be noted that in turning a curve the force acting in the axial direction on the tire, will permit the latter to be slightly displaced in that direction of the wheel and in this manner skidding of the vehicle will be avoided to a great extent.

In the drawing three sections 17 of the retaining member have been shown, but it is evident, that this number may be varied and increased for larger wheels.

Instead of providing a rubber tire 26 the rim portion 25 of the felloe may form the actual tread of the wheel and in such a case it will naturally be made to protrude further beyond the edge of the flared portions 12 and 15 of the wheel body and the retaining member.

The thickness of the flange 22 of the felloe 21 is less than the space formed between the flat radial walls of the body 10 and the retaining member 14, so that the flange may move freely in and out between the walls without friction. In other words, the load is normally sustained by the flared rim portions 12 and 15 upon the flared sides of the felloe 24, so that there will be practically no side strain on the flange 22, even with heavy loads or fairly great shocks.

On the other hand and in order not to strain the springs 20 unduly, or cause the bolts 18 to snap under an excessive shock or an overload, the difference between the diameters of the adjacent peripheral surfaces of flange 22 and ledge 13 is not so great but that the interposed abutment 16 can make contact with both of these surfaces under such conditions. The remainder of the shock after being somewhat modified by the rubber tire 26, and further lessened by the action of the springs 20, will then be taken up by the abutment 16, as communicated by the flange 22, and ultimately delivered to the wheel body 10 through the ledge 13.

Having thus described the invention what is claimed as new is:

1. A vehicle wheel comprising a wheel body having a flared annular rim portion, a felloe provided with correspondingly flared portions on both sides thereof, an annular retaining member divided into sections with a correspondingly flared portion, and means for yieldably holding said portions in contact.

2. A vehicle wheel comprising a wheel body having a flared annular rim portion, a felloe provided with correspondingly flared portions on both sides thereof, an annular retaining member divided into sections with a correspondingly flared portion, means for yieldably holding said portions in contact, and an annular ledge on said wheel body adapted to form an abutment for said retaining member.

3. A vehicle wheel comprising a wheel body having a flared annular rim portion, a felloe provided with correspondingly flared portions on both sides thereof, an annular retaining member divided into sections with a correspondingly flared portion, means for yieldably holding said portions in contact, and an annular ledge on said wheel body adapted to form an abutment for said retaining member, said means including springs and lateral bolts therefor engaging in suitable holes provided in said wheel body and said retaining member, said felloe having apertures for said bolts of larger diameter than said bolts.

4. A vehicle wheel comprising a wheel body having a flared annular rim portion, a felloe provided with correspondingly flared portions on both sides thereof, an annular retaining member divided into sections with a correspondingly flared portion, means for yieldably holding said portions in contact, and an annular ledge on said wheel body adapted to form an abutment for said retaining member, said means including springs and lateral bolts therefor engaging in suitable holes provided in said wheel body and said retaining member, said felloe having apertures for said bolts of larger diameter than said bolts, the inner periphery of the felloe being larger than the inner periphery of said retaining member whereby radial displacement of said felloe is possible with regard to the wheel body.

5. A vehicle wheel comprising a wheel body, a felloe and an annular retaining member divided into arcuate sections; said felloe having a hollow rim portion of equilateral triangular cross section with its base at the outer periphery and a central inwardly directed flange; said body and said member having annular portions adapted to engage with the adjacent sides of said rim portion; said body being provided with an annular ledge abutting against the inner peripheral edge of said member; said body and said member having corresponding holes and said flange having apertures of larger diameter than said holes, and bolts with springs engaging in said holes and apertures for holding the parts yieldably together.

In testimony whereof I affix my signature.

THOMAS I. TINGLEY. [L. S.]